United States Patent [19]

Cesarz et al.

[11] 4,300,086

[45] Nov. 10, 1981

[54] CONTROL CIRCUIT FOR A.C. INDUCTION MOTOR

[75] Inventors: Michael R. Cesarz, Mequon; Richard E. Stobbe, Greenfield, both of Wis.

[73] Assignee: Kearney & Trecker Corporation, West Allis, Wis.

[21] Appl. No.: 24,561

[22] Filed: Mar. 28, 1979

[51] Int. Cl.³ .............................................. H02P 5/16
[52] U.S. Cl. .................................... 318/801; 318/807; 318/814
[58] Field of Search ............... 318/807, 808, 814, 798, 318/812, 806, 802, 803

[56] References Cited

U.S. PATENT DOCUMENTS

| | | | |
|---|---|---|---|
| 3,584,279 | 6/1971 | Krauthamer | 318/808 |
| 3,619,749 | 11/1971 | Schieman | 318/798 |
| 3,748,556 | 7/1973 | Gillett | 318/808 |
| 3,764,872 | 10/1973 | Boice | 318/798 |
| 4,099,108 | 7/1978 | Okawa et al. | 318/808 |

*Primary Examiner*—B. Dobeck
*Attorney, Agent, or Firm*—Cyril M. Hajewski; Robert B. Levy

[57] ABSTRACT

The voltage and frequency of an A.C. excitation signal applied to the stator windings of an A.C. induction motor are varied in proportion to the amplitude of current flowing in the stator windings. The stator current flow is sensed by a feedback resistor in series with the inverter which generates the A.C. excitation signal for the stator windings. The voltage drop aross the feedback resistor is summed with a VELOCITY COMMAND voltage which indicates the desired speed of the motor and the summed voltage controls the frequency and the amplitude of the A.C. excitation voltage in a constant volts per hertz manner. The stator current feedback holds the motor speed constant in spite of variations in the load on the motor.

7 Claims, 2 Drawing Figures

1

CONTROL CIRCUIT FOR A.C. INDUCTION MOTOR

BACKGROUND OF THE INVENTION

A well-known and often used method fo speed control for an A.C. induction motor is the "constant volts per hertz" technique. This method is based on the inherent speed regulation capability of the A.C. induction motor, which is that its synchronous, no-load speed is proportional to the excitation frequency according to the relationship NRPM =(120×frequency) number of poles. Thus, a four pole A.C. induction motor has a synchronous speed of 1800 RPM at 60 Hz. of excitation. The "constant volts per hertz" means that if the motor excitation is lowered to 30 Hz., the voltage applied to the motor must be lowered to half of its value at 60 Hz., and if the motor excitation is raised to 120 Hz. the voltage applied to the motor must be doubled to achieve the same output current. But the speed regulation of the "constant volts per hertz" method is relatively inaccurate because the torque producing mechanism of the motor requires slip or a reduction in motor speed from its synchronous speed. The lowest slip induction motors available are rated at 2% slip, and therefore, 2% regulation is the best that can be achieved with the "constant volts per hertz" method.

In the past, when more accurate speed regulation was required, a tachometer had to be employed along with means for varying the frequency of excitation to achieve a predetermined output of the tachometer. But a tachometer is relatively expensive, takes up space, and places speed limitations on the motor that are undesirable in high speed applications. Accordingly, the principal object of this invention is to provide motor control circuit which has highly accurate speed regulation but does not require a tachometer. Other objects and advantages of the invention will be apparent from the detailed description herein.

SUMMARY OF THE INVENTION

In accordance with this invention, the foregoing object is attained by sensing the stator current of the induction motor and providing a frequency control circuit in which the frequency is automatically increased when the stator current increases and is automatically decreased when the stator current decreases. The relationship between the magnitude of stator current change and the magnitude of frequency change is selected to provide substantially constant rotor speed from no-load condition to over-load condition.

DESCRIPTION OF THE PREFERRED EMBODIMENTS

Figure 1:
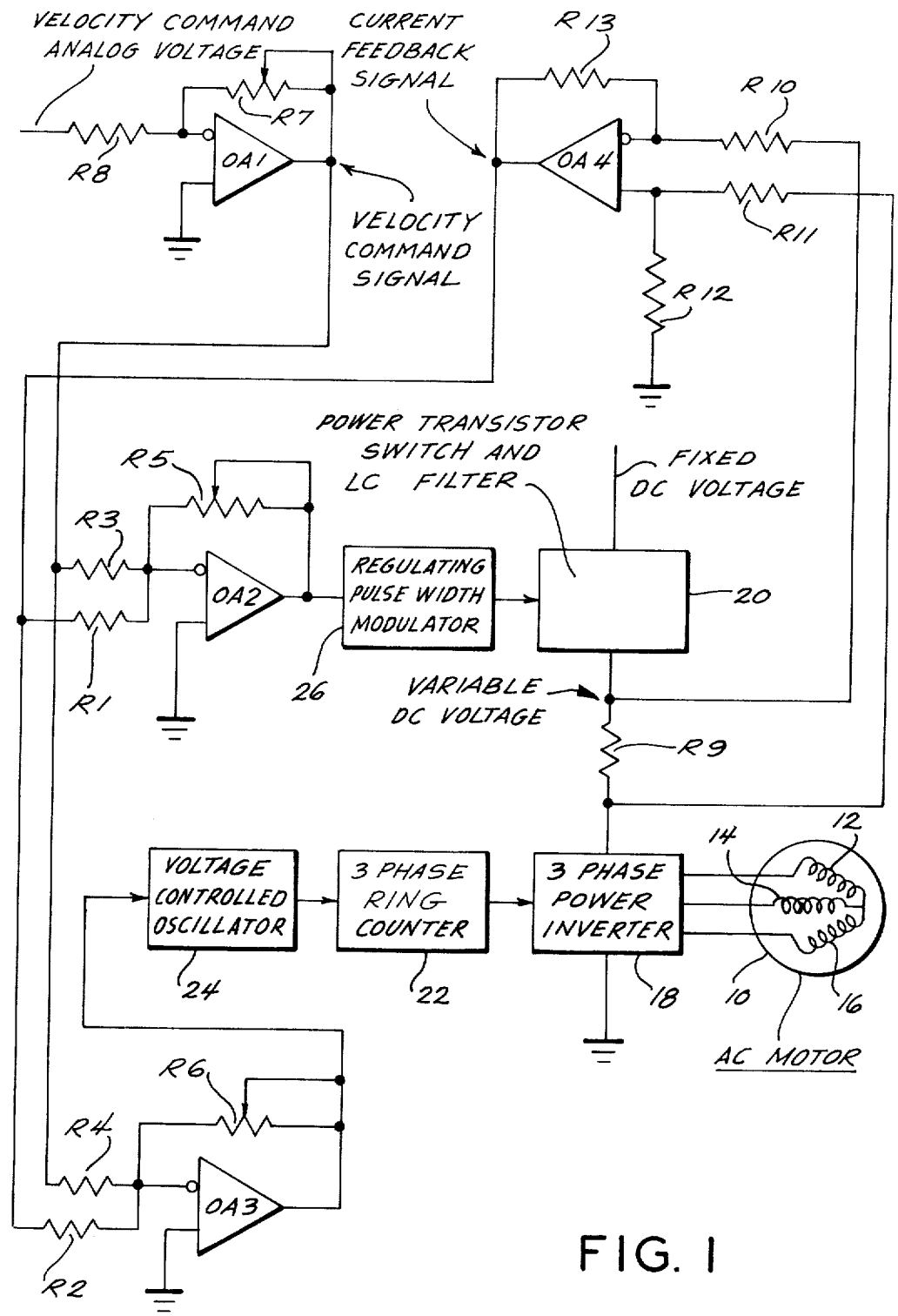
FIG. 1 is a schematic circuit diagram of one preferred embodiment of the invention.

Referring to FIG. 1, one preferred embodiment of the invention includes means for applying a 3-phase excitation signal to a 3-phase, four pole A.C. induction motor 10 having stator windings 12, 14 and 16 along with a squirrel cage rotor (not shown). The 3-phase excitation signal is generated in a 3-phase inverter 18 which receives a variable D.C. voltage input from a power transistor switch and L.C. filter circuit 20, and also receives a 3-phase A.C. input signal from a 3-phase ring counter 22. Inverter 18 produces a 3-phase A.C. excitation signal having the peak amplitude of the D.C. input voltage and the frequency of the A.C. input.

The frequency of 3-phase ring counter 22 is determined by a voltage controlled oscillator 24 which receives an input voltage from summing amplifier OA3. The amplitude of the D.C. output voltage of power transistor switch and L.C. filter 20 depends upon the ratio between the on-time and off-time of the voltage produced thereby. This is controlled by a regulating pulse width modulator 26 which sets the ratio of on-time and off-time in accordance with a D.C. input signal from summing amplifier OA2. The outputs of summing amplifiers OA2 and OA3 are determined in part by a common input signal from operational amplifier OA1 through resistors R3 and R4, respectively. The gain of summing amplifiers OA2 and OA3 can be adjusted by means of feedback potentiometers R5 and R6, respectively. The gain of operational amplifier OA1 can be adjusted by feedback potentiometer R7.

Although resistors are used as impedances in this embodiment, it will be understood by those skilled in the art that inductors or capacitors could be used as impedances in other embodiments of the invention.

An analog VELOCITY COMMAND voltage is applied to one input of operational amplifier OA1 through resistor R8. The VELOCITY COMMAND voltage determines the frequency and amplitude of the A.C. excitation applied to stator windings 12, 14 and 16 of motor 10 through the action of the circuit elements described above. The frequency and amplitude are controlled by summing amplifiers OA2 and OA3 in a "constant volts per hertz" manner.

As thus far described, the motor control circuit is similar to the circuit disclosed in our co-pending application Ser. No. 19,936, filed Mar. 12, 1979, for an "A.C. MOTOR CONTROL CIRCUIT", the entire disclosure of which is hereby incorporated herein by reference. The circuit in the above-noted co-pending application utilizes a tachometer as a motor speed feedback element. In this invention, the tachometer is replaced by a current sensing resistor R9 coupled in series with the D.C. input to the 3-phase power inverter 18 which generates the 3-phase excitation signal for motor 10. The current through resistor R9 is proportional to the torque and slip of motor 10, and the voltage drop across resistor R9 is therefore proportional to the torque and slip of motor 10. This voltage drop is coupled via resistors R10, R11 and R12 to the input of operational amplifier OA4 which is connected to act as a differential amplifier. Resistor R13 is a feedback resistor.

The output of operational amplifier OA4 is applied via resistors R1 and R2 to the inputs of summing amplifiers OA2 and OA3, respectively, where it is summed with the output of the VELOCITY COMMAND amplifier OA1. Thus, the outputs of summing amplifiers OA2 and OA3 are equal to the sum of the VELOCITY COMMAND signal and the CURRENT FEEDBACK signal.

Figure 2:
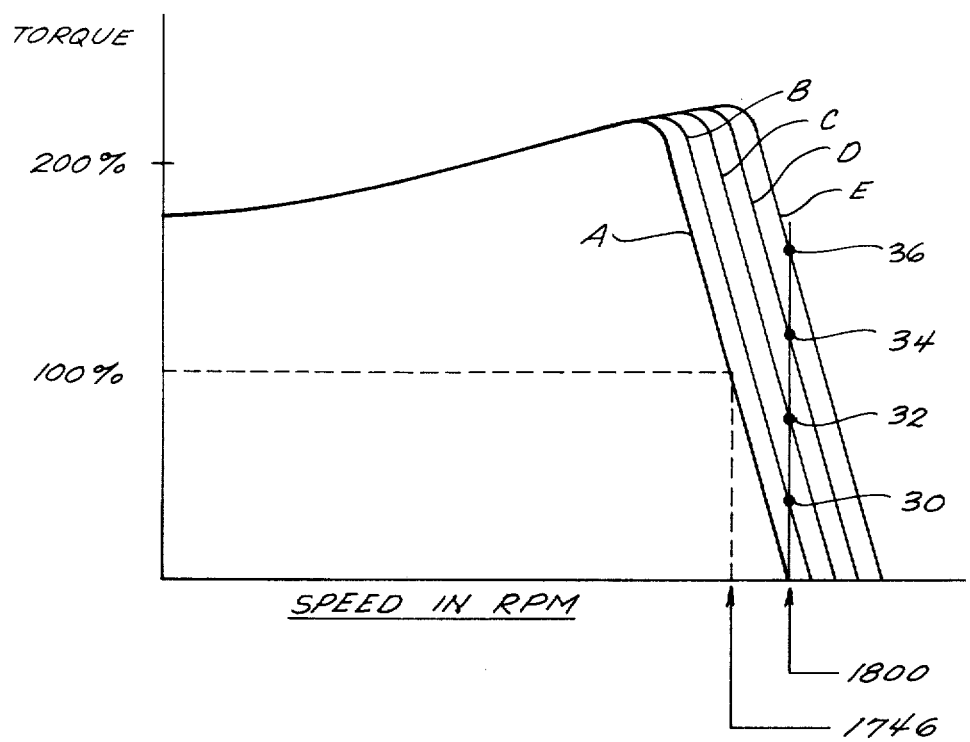
FIG. 2 is a set of speed vs. torque curves for the embodiment of FIG. 1.

The operation of the above-described circuit is illustrated in the speed vs. torque curves shown in FIG. 2. Curve A represents the speed vs. torque curve of motor 10 at a 60 Hz. excitation frequency. Normally, a motor whose synchronous speed is 1800 RPM will be designed to operate at a lower speed, e.g. 1746 RPM, since a certain measure of slip is required to develop 100% output torque. With the control circuit of this invention, however, the motor operates with a very small error slip at its starting synchronous speed throughout its full range of operation from no-load to over-load. The error slip is the small amount of slip from synchronous speed at no-load conditions. If operation at exactly 1800 RPM is desired, the effect of the initial error slip can be removed from the circuit by adjustment of R7. As the motor is loaded, is stator current increases which causes the synchronous frequency to rise due to the CURRENT FEEDBACK signal. Curves B, C, D and E show the speed vs. torque curve at different load conditions ranging from a light load (curve B) to overload (curves D and E). The motor's speed remains constant at 1800 RPM but is position on the speed vs. torque curve varies, as indicated by points 30, 32, 34 and 36, as the load is varied from no-load to overload. The speed vs. torque curve shifts to the right in FIG. 2 as the load on the motor is increased and shifts to the left in FIG. 2 as the load is decreased. It should be noted that the speed regulating action of this invention does not depend upon the rated slip of the motor. The circuit of this invention can maintain the same degree of speed regulation on a motor rated at 10% slip as on a motor rated at 2% slip. It thus enables the circuit designer to ignore percentage of slip as a design criterion and select the motor according to other criteria.

As the VELOCITY COMMAND voltage is varied, the speed of motor 10 will also vary within its operating range. Thus, the speed of motor 10 can be set at any desired value within its operating range by generating the appropriate VELOCITY COMMAND voltage. The CURRENT FEEDBACK voltage will hold the motor speed at the selected value as the load on the motor varies.

Although the illustrative embodiment of the invention has been described in considerable detail for the purpose of fully disclosing a practical operative structure incorporating the invention, it is to be understood that the particular circuits shown and described are intended to be illustrative only and that the various novel features of the invention may be incorporated in other circuits without departing from the spirit and scope of the invention as defined in the subjoined claims.

The principles of this invention having now been fully explained in connection with the foregoing, we hereby claim as our invention:

1. A motor control circuit for energizing an A.C. induction motor and for controlling the speed thereof, said A.C. induction motor having a rotor and having a plurality of stator windings, said motor control circuit comprising:
   a D.C. voltage source;
   an inverter which is operable to convert a D.C. input voltage into an A.C. output voltage, the input of said inverter being coupled to said D.C. voltage source and the output of said inverter being coupled to said stator windings;
   means for varying the output frequency of said inverter;
   current sensing means for sensing the magnitude of current flowing in said stator windings; and
   means coupled to said current sensing means and to said means for varying the output frequency of said inverter for increasing the frequency of said inverter when the magnitude of stator current rises above the magnitude of stator current drawn by said motor during no-load conditions and for decreasing the frequency of said inverter when the magnitude of stator current falls from a magnitude greater than the magnitude of stator current drawn by said motor during no-load conditions until the stator current magnitude equals the stator current magnitude at no-load motor conditions to hold the rotary speed of said rotor substantially constant in spite of variations in the load driven thereby.

2. A motor control circuit according to claim 1 and further comprising:
   means for varying the output voltage of said D.C. voltage source; and
   means coupled to said current sensing means and to said means for varying the output voltage of said D.C. voltage source to raise said output voltage when the magnitude of stator current rises above the magnitude of stator current drawn by said motor during no-load conditions and to lower said output voltage when the magnitude of stator current falls from a magnitude greater than the magnitude of stator current drawn by said motor at no-load conditions until the magnitude of stator current equals the magnitude of stator current drawn during no-load conditions.

3. A motor control circuit according to claim 1 wherein said current sensing means comprises an impedance coupled in series with said inverter.

4. A motor control circuit according to claim 3 wherein said means for varying the output frequency of said inverter comprises:
   a voltage controlled oscillator which is operable to produce an A.C. output signal having a frequency which is proportional to the magnitude of an input voltage applied to the input terminal of said voltage controlled oscillator; and, further comprising:
   a summing amplifier having two inputs and an output, the output of said summing amplifier being coupled to the input terminal of said voltage controlled oscillator;
   means coupling one input of said summing amplifier to said current sensing impedance;
   a VELOCITY COMMAND voltage having an amplitude which is proportional to a desired motor speed; and
   said VELOCITY COMMAND voltage being coupled to the other input of said summing amplifier.

5. A motor control circuit according to claim 4 wherein said means coupling one input of said summing amplifier to said current sensing impedance comprises a differential amplifier coupled between said current sensing impedance and said input of said summing amplifier.

6. A motor control circuit for energizing an A.C. induction motor and for controlling the speed thereof, said A.C. induction motor having a plurality of stator windings, said motor control circuit comprising:
   a fixed D.C. voltage source;
   a pulse width modulator operable to produce an output pulse width which is proportional to the magnitude of the input voltage appllied to the input terminal of said pulse width modulator;
   a power switch circuit coupled to said fixed D.C. voltage source, said power switch circuit coupled to said pulse width modulator and being operative to chop the voltage produced by said fixed D.C. voltage source proportional to the output pulse width of said pulse width modulator;

an inverter which is operable to convert a D.C. input voltage into an A.C. output voltage, the input of said inverter coupled to the output of said power switch circuit and the output of inverter coupled to the stator windings of said A.C. induction motor;

current sensing means for sensing the magnitude of current flowing in said stator windings and for producing an output voltage varying accordingly;

a summing amplifier having first and second inputs and an output, said summing amplifier output coupled to the input terminal of said pulse width modulator, said first input of said summing amplifier being supplied with a velocity command voltage varying in magnitude with desired motor speed and said second summing amplifier input supplied with the output voltage produced by said current sensing means;

means for varying the output frequency of said inverter; and means coupled to said current sensing means and to said means for varying the output frequency of said inverter for increasing the frequency of said inverter when the magnitude of stator current rises above the magnitude of stator current drawn at no-load conditions and for decreasing the frequency of said inverter when the magnitude of stator current falls from a magnitude greater than the magnitude of stator current drawn at no-load conditions until the magnitude of stator current equals the magnitude of stator current drawn at no-load conditions to hold the rotary speed of said rotor substantially constant notwithstanding variations in the load driven thereby.

7. A motor control circuit for energizing an a.c. induction motor and for controlling the speed thereof, said a.c. induction motor having a rotor and a plurality of stator windings, said motor control circuit comprising:

a d.c. voltage source;

means for varying the voltage magnitude of said d.c. voltage source;

an inverter which is operable to convert a d.c. input voltage into an a.c. output voltage, the input of said inverter being coupled to said d.c. voltage source and the output of said inverter being coupled to said motor stator windings;

means for varying the output frequency of said inverter;

current sensing means for sensing the magnitude of current flowing in said stator windings;

means coupled to said current sensing means and to said means for varying the output frequency of said inverter for increasing the frequency of said inverter when the magnitude of stator current rises above the magnitude of stator current drawn by said motor during no load conditions and for decreasing the frequency of said inverter when the magnitude of stator current falls from a magnitude greater than the magnitude of stator current drawn by said motor during no load conditions until the stator current magnitude equals the stator current magnitude at no load motor conditions to hold the rotary speed of said rotor substantially constant notwithstanding variations in the load driven thereby; and means coupled to said current sensing means and to said means for varying the voltage of said d.c. voltage source to raise the magnitude of voltage supplied from said d.c. voltage source to said inverter when the magnitude of stator current rises above the magnitude of stator current drawn on said motor during no load conditions and to lower the magnitude of voltage supplied to said inverter when the magnitude of stator current drawn by said motor falls from a magnitude greater than the magnitude of stator current drawn by said motor at no load conditions until the magnitude of stator current equals the magnitude of stator current drawn during no load conditions.

* * * * *